UNITED STATES PATENT OFFICE.

EMILE JEAN LOURDEL, OF RHEIMS, FRANCE.

PROCESS OF PRESERVING THE AROMA OF DECORTICATED PULSES.

1,046,314. Specification of Letters Patent. Patented Dec. 3, 1912.

No Drawing. Application filed February 26, 1912. Serial No. 679,986.

*To all whom it may concern:*

Be it known that I, EMILE JEAN LOURDEL, a citizen of the French Republic, and resident of Rheims, France, have invented certain new and useful Improvements in Processes of Preserving the Aroma of Decorticated Pulses, of which the following is a specification.

Decorticated haricot beans do not acquire when being cooked the aroma which pleases in the entire haricot beans. The reason of this is that the aromatic substance does not preëxist in this leguminous seed; it is formed only as a consequence to a sufficiently prolonged ebullition by the reaction of a principle which is to be found in the skin, on another principle contained in the body. When one cooks in water in two separate vessels the skins and the bodies the aroma is not produced, but if one cooks the bodies in the broth which has been previously prepared with the skins, the said aroma is generated. The broth which contains the active principle of the skins can be concentrated as much as one desires to do, it may even be concentrated until the state of complete desiccation is reached. This extract is without an action in the cold on the active principle of the bodies, but finds its properties again when it is kept in presence of water at a temperature which is in the neighborhood of that of the ebullition. It is possible to base upon this observation a process or method of preparing decorticated haricot beans which acquire by boiling the aroma of the entire beans as well as a method or process for preparing extracts intended to give aroma to ordinary decorticated haricot beans.

The skins are collected at the moment of the decortication, then put into a boiler with a quantity of water which is sufficient for keeping them immersed and are thereafter brought to a boil during several hours. The operation is carried out preferably in a hermetically closed boiler heated to between 115° and 120°; in this case a shorter time is required and the skins are better deprived of their active principle. The broth is separated from the skins, and then evaporated. It is possible to carry the evaporation more or less far according to whether it is desired to soak the decorticated haricot beans with the active principle or to cover them with a kind of varnish. After they have been treated in one way or the other, they are dried in a drying stove.

There is not always in the haricot beans an equivalent proportion of the active principles of the body and the skin. It will consequently be sometimes possible, if one desires to increase the aroma, to employ a larger quantity of skins than that yielded by the haricot beans treated; on the other hand the said amount may be reduced if one desires to produce an attenuated flavor.

If the flavor of the various varieties of haricot beans is different, this comes from the principle contained in the body; it is the latter which produces the aroma, the skin only supplies the developer. It is therefore possible in commercial manufacture to introduce foreign skins for instance those obtained from ground haricot beans for the purpose to mix a flour obtained therefrom with flour.

In cases where one would like to produce granulated material or haricot flour, one may either pulverize or granulate the seed which has already been soaked with the extract of the skin or mix afterward this extract with the flour or the granulated product.

By concentrating to a more or less extended degree the broth obtained with the skins, liquid or solid extracts will be obtained which when preserved by the usual methods can be supplied to the consumer with a view of being added to ordinary decorticated haricot beans.

The haricot bean has been cited by way of example in the specification given above; the same process can be applied to any of the seeds of the leguminous family employed in the alimentation of man, such as lentils, peas, beans and so on. The peas may seem to make an exception, the peas being a very much esteemed food; this must be imputed to the fact that the pea has already by itself an agreeable flavor. This flavor however is rendered much more delicate if the above described treatment is applied to peas.

Having now fully described my said invention, what I claim and desire to secure by Letters Patent, is:

1. A method of preparing decorticated pulses consisting in adding to the decorticated bodies thereof the extract obtained from their skins, substantially as and for the purpose set forth.

2. The method of preparing decorticated pulses consisting in adding to derivates of the decorticated bodies of the pulses the extract obtained from their skins, substantially as and for the purpose set forth.

3. A method of preparing decorticated pulses, consisting in separating the skins from the body portion and extracting the active principle from the skins condensing and adding to the decorticated bodies the extract obtained.

4. In a method of preparing decorticated pulses the steps consisting in extracting the active principle from the skins of said pulses and then concentrating the said extract.

In testimony whereof I have hereunto set my hand in presence of two witnesses.

EMILE JEAN LOURDEL.

Witnesses:
H. BARDEL,
E. DELBÉ.